United States Patent [19]

Schweizer et al.

[11] Patent Number: 4,927,322

[45] Date of Patent: May 22, 1990

[54] STACK STRIPPER FOR A STACKING MACHINE

[75] Inventors: Werner Schweizer, Boynton Beach; Daniel J. McGuire, Ft. Lauderdale; Edward D. Archer, Lantana, all of Fla.

[73] Assignee: Curt G. Joa, Inc., Sheboygan Falls, Wis.

[21] Appl. No.: 349,119

[22] Filed: May 8, 1989

[51] Int. Cl.$^5$ .............................................. B65G 25/00
[52] U.S. Cl. ............................ 414/794.7; 414/788.1; 198/429; 198/430; 53/152
[58] Field of Search ..................... 198/418.4, 430, 429, 198/418.9, 426; 414/331, 794.7, 791, 788.1; 53/152, 153

[56] References Cited

U.S. PATENT DOCUMENTS

| | | | |
|---|---|---|---|
| 3,191,748 | 6/1965 | Martin | 198/430 |
| 3,995,748 | 12/1976 | Looney | 414/791 X |
| 4,325,475 | 4/1982 | Spalding | 198/429 |
| 4,399,905 | 8/1983 | Lance et al. | 198/430 |
| 4,523,671 | 6/1985 | Campbell | 198/429 |
| 4,802,570 | 2/1989 | Hirsch et al. | 198/430 X |

Primary Examiner—Robert J. Spar
Assistant Examiner—James R. Bidwell
Attorney, Agent, or Firm—Fuller, Ryan & Hohenfeldt

[57] ABSTRACT

A vertically extending stripper bar is manipulated to strip a stack of articles from a conveyor while the conveyor is carrying the articles downwardly at high speed. A carriage is mounted for being vertically movable. A pneumatic cylinder is coupled to the carriage. The stripper bar is supported on horizontal guide rods which slide in the vertically movable carriage. A pneumatic cylinder moves the stripper bar horizontally in and out relative to the conveyor. When the correct number of articles has accumulated next to the bar, a stripping cycle is initiated. This involves activating one pneumatic cylinder which pushes the stripper bar horizontally across the path of the downwardly moving articles. A gear rack is mounted to the vertically movable carriage and it is engaged by a gear which begins to drive the carriage and stripper bar downwardly at the same speed that the articles are moving downwardly at the instant the stripper bar begins to move horizontally. At the instant when the stripping cycle begins, a clutch is engaged to make the gear drive the carriage downwardly by driving the rack. When the stack of articles is cleared of the paddles, the clutch is disengaged and the gear can turn freely. The pneumatic cylinder which is coupled to the carriage drives the carriage upwardly back to its home position in readiness for stripping the next stack to accumulate.

7 Claims, 4 Drawing Sheets

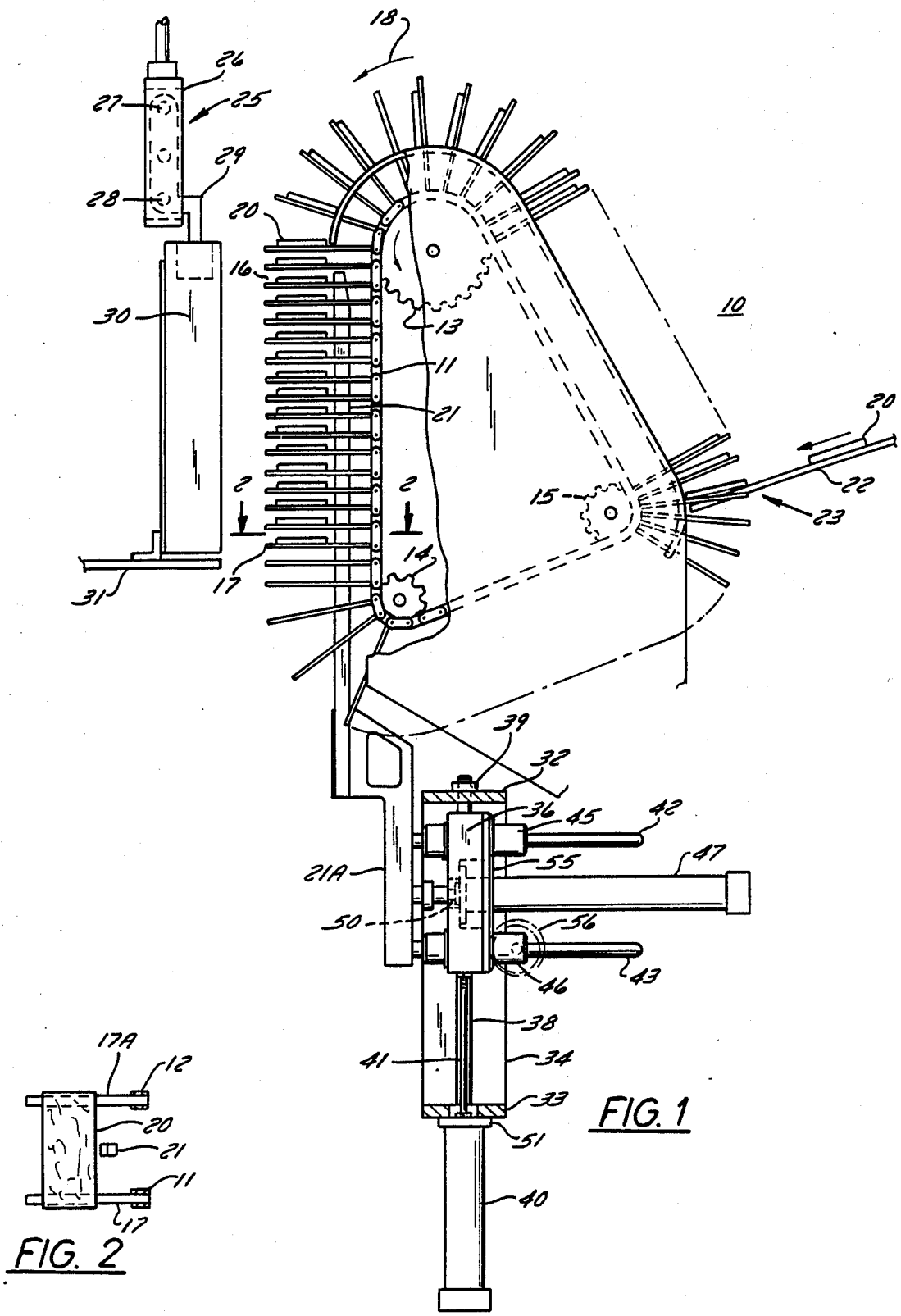

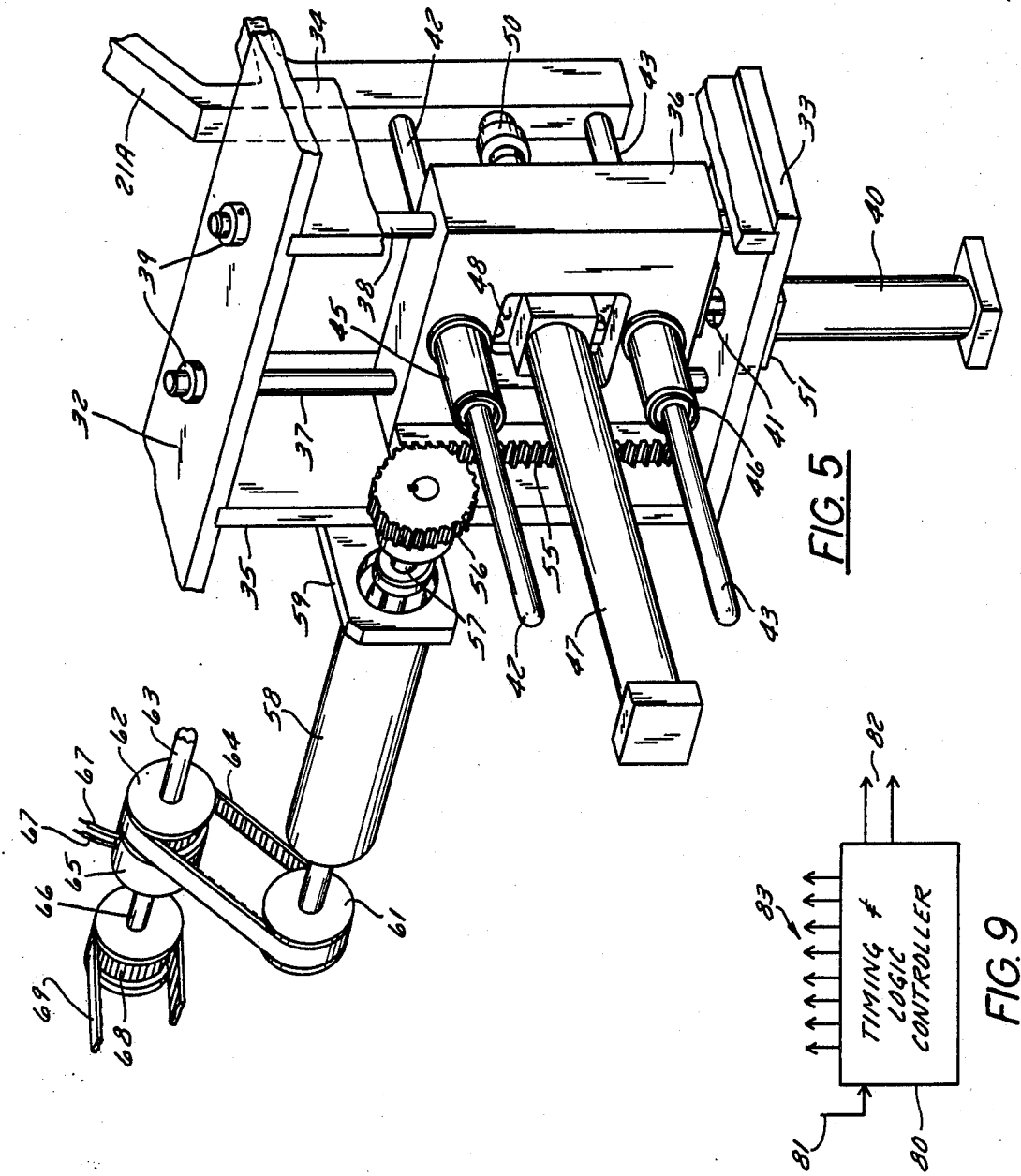
FIG. 5
FIG. 9
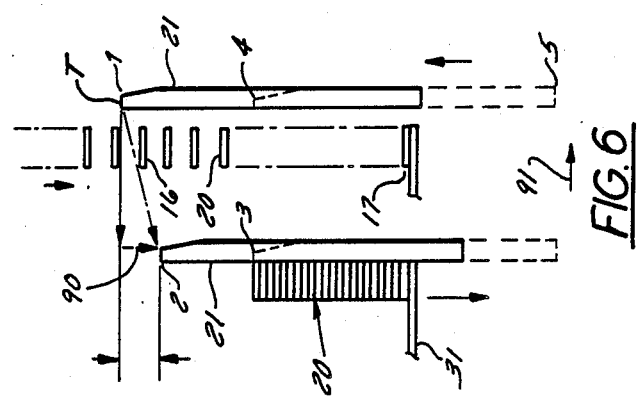
FIG. 6

STACK STRIPPER FOR A STACKING MACHINE

Background of the Invention

The invention disclosed herein pertains to a machine for stacking articles. In particular, the invention resides in an improved device for stripping a stack of articles from the stacking machine while the stacking machine is in motion. Usually, each stack of articles that is removed from the machine is forwarded to a packaging machine.

A widely used conventional stacker, which was developed primarily for handling articles such as disposable diapers and sanitary pads, has two closed loop conveyor chains running in parallelism on sets of three sprockets whose horizontal rotational axes are parallel and arranged at the corners of a triangle. A series of rows of paddles or fingers are fastened to the conveyor chains and extend outwardly from the chains. At one place, where the paddle carrying chains pass over a sprocket, the paddles fan out to provide space between them for feeding the articles from a flat belt conveyor into the space. The paddles then carry the articles upwardly and when the conveyor chains pass around the uppermost sprockets the articles transfer from trailing paddles to leading paddles and then the paddles with an article on them travel downwardly with the correspondingly movable conveyor chains along a substantially vertical path. After that, the paddles, which are now descending with the conveyor chains, extend horizontally away from the chains, one above the other, so that an article on corresponding paddles on each chain contributes to forming a stack of articles which are resting on the paddles and are spaced apart vertically by the distance between each two consecutive sets of paddles.

In known stacking machines of the type being discussed, a vertically extending stripper bar is used to push a predetermined number of articles off of the paddles simultaneously in which case the articles form a stack. After the stripper bar has pushed a stack of articles off the paddles, the stripper bar is standing outwardly of and in juxtaposition to the emptied column of vertically moving paddles. By this time, the upper paddles in the series of vertically moving paddles are occupied by articles which are descending at the speed of the stacking machine. It is necessary to quickly restore the stripper bar to a position behind the position of the articles on the paddles so that the bar will be in readiness for pushing the next stack or group off the paddles. In conventionally designed article strippers, the stripper bar is mounted on a carriage which is constrained to execute bidirectional vertical movements. The stripper bar is movably mounted on the carriage and is constrained to move substantially horizontally and bidirectionally. Fluid pressure responsive actuators such as pneumatic work cylinders are controlled to cyclically move the stripper bar alternately inwardly and outwardly of the paddles and to move the carriage up and down. The control is such that after a stack is stripped from the paddles the stripper bar is pushed inwardly of the paddles on the two conveyor chains and upwardly to its highest position wherein it is ready to push the next of articles that has formed in front of it off the paddles. In the conventional stacking machine, the pusher bar is driven outwardly toward the outer ends of the paddles to cause a stack of articles to slide off of the paddles. Since the pusher bar moves inwardly and outwardly between the pairs of paddles there is no interference between the paddles and bar. When the bar reaches its outward limit the stripper bar is caused to descend rapidly according to prior practice and then move inwardly horizontally after which the carriage is driven upwardly to restore the bar to its uppermost starting position.

When the stripper bar in stacking machine begins its outward stripping movement, its upper end is supposed to be in line with the uppermost article forming the group that will be stacked. The articles on the paddles, of course, are moving downwardly continuously so proper synchronization between the movements of the articles on the paddle and the stripper bar is important. Because it is necessary to strip the top article from the paddles within the paddle opening, prior systems required optimum timing between operation of the air cylinders that moves the stripper bar horizontally to move the stack out and the downward motion of the paddle conveyor chains. Improper timing can result in damage to the machine or in a stack containing more or fewer than the intended number of articles. It will be evident that since the paddle conveyor is in downward motion at all times at a constant speed it would be desirable to impart to the generally horizontally moving stripper bar a vertical component of speed that matches the downward speed of the paddles during stripping. Prior practice was to slant the guide rods which support the stripper bar downwardly so that speed matching was at least right for one conveyor speed.

A stacking machine is usually one part of a more comprehensive article fabricating equipment. For instance, the stacking machine such as the one here under consideration is commonly used in a disposable diaper fabricating machinery system. In conventional machines, it has been possible to get fairly accurate correlation between the position of the group of articles on the paddles and the pusher bar as long as all machinery in the system was operated at a fixed rate. However, there are times when an assembly or fabricating line may be speeded up or slowed down such that the proper timing relationship between the position of the paddles and the stripper bar is lost. The criticality of proper timing can be appreciated if one recognizes that in a given machine used for stacking articles such as diapers, stack sizes may range from 5 to 20 and up to 45 stacks per minute may be handled. This is indicative of how fast the stripper bar must be moving horizontally in order to stay in proper alignment with the articles during the brief moment when the articles are being slid off of the paddles.

SUMMARY OF THE INVENTION

In accordance with the invention, means are provided for moving the stripper bar downwardly while it is executing its stripping motion in perfect correlation with the continuous downward movement of the articles at all machine speeds. An important feature of the invention resides in providing for the downward speed of the stripper bar being automatically adjusted to correlate with whatever speed at which other machinery in the production system is feeding articles through the stacking machine.

A significant part of the conventional stripper bar manipulating mechanism can be used. However, instead of relying exclusively on a pneumatic cylinder to drive down the vertically moving carriage on which the stripper bar is mounted an independently controllable device is used. A vertically extending gear rack is fastened to the carriage. A gear that is mounted on a journaled shaft meshes with the gear rack. The shaft is driven intermittently from the output shaft of an electrically operated clutch. Mechanical power to the input of the clutch is derived from the main drive of the more comprehensive article production machine system. A logic controller causes the clutch to engage at the moment horizontal shifting of the stripper bar is to begin. When the clutch engages, the gear rotates and drives the vertical carriage for the stripper bar downwardly with a vertical speed component that is necessarily always synchronized or matched with the speed at which the paddles are descending since all parts of the system are driven by the same main drive power source. In all modes the carriage is driven vertically by means of the gear at least during the time that the stripper bar is being pulled across the path of the articles when it is important for the speeds of the bar and paddles to be matched. In the first mode used for products which have a narrow lateral dimension such as sanitary napkins as compared to disposable diapers, the gear is powered rotationally from the instant the stripper bar engages the stack of articles and power drive is maintained for the full descent of the carriage and the stripper bar thereon. Shifting the bar carriage horizontally during the later part of its downward travel and upwardly again to its home position for engaging the next accumulated stack is done with pneumatic cylinders.

In a second mode the drive gear is powered rotationally to drive the carriage and stripper bar thereon down until the stack of articles is deposited and then a clutch through which the gear is driven is disengaged to let the carriage drop under the influence of gravity while the gear is free wheeling. As in all modes, pneumatic cylinders restore the stripper bar to its home position in readiness for stripping another stack of articles from the paddles.

In the third mode, used for wide articles such as adult diapers where the stripping stroke is long outside of the paddles so fast action is necessary, to assume the stripper bar will return home in time, rapid dropping of the carriage is accomplished by using the pneumatic cylinder to drive the stripper bar carriage downwardly starting the moment synchronism is no longer necessary.

A more detailed description of a preferred embodiment of the invention will now be set forth in reference to the accompanying drawings.

DESCRIPTION OF THE DRAWINGS

FIG. 1 is a side elevational view, partly schematic, of a stacker of the closed loop conveyor chain type;

FIG. 2 is a partial horizontal section taken on a line corresponding to 2—2 in FIG. 1;

FIG. 5 is an isolated perspective view of the improved stripper bar operating mechanism;

FIG. 6 is a diagram which is useful for explaining the timing and physical movements of the stripper bar;

FIG. 9 constitutes a symbolic representation of the timing and logic controller which governs operation of the stripper bar driving mechanism.

DESCRIPTION OF A PREFERRED EMBODIMENT

Figure 4:
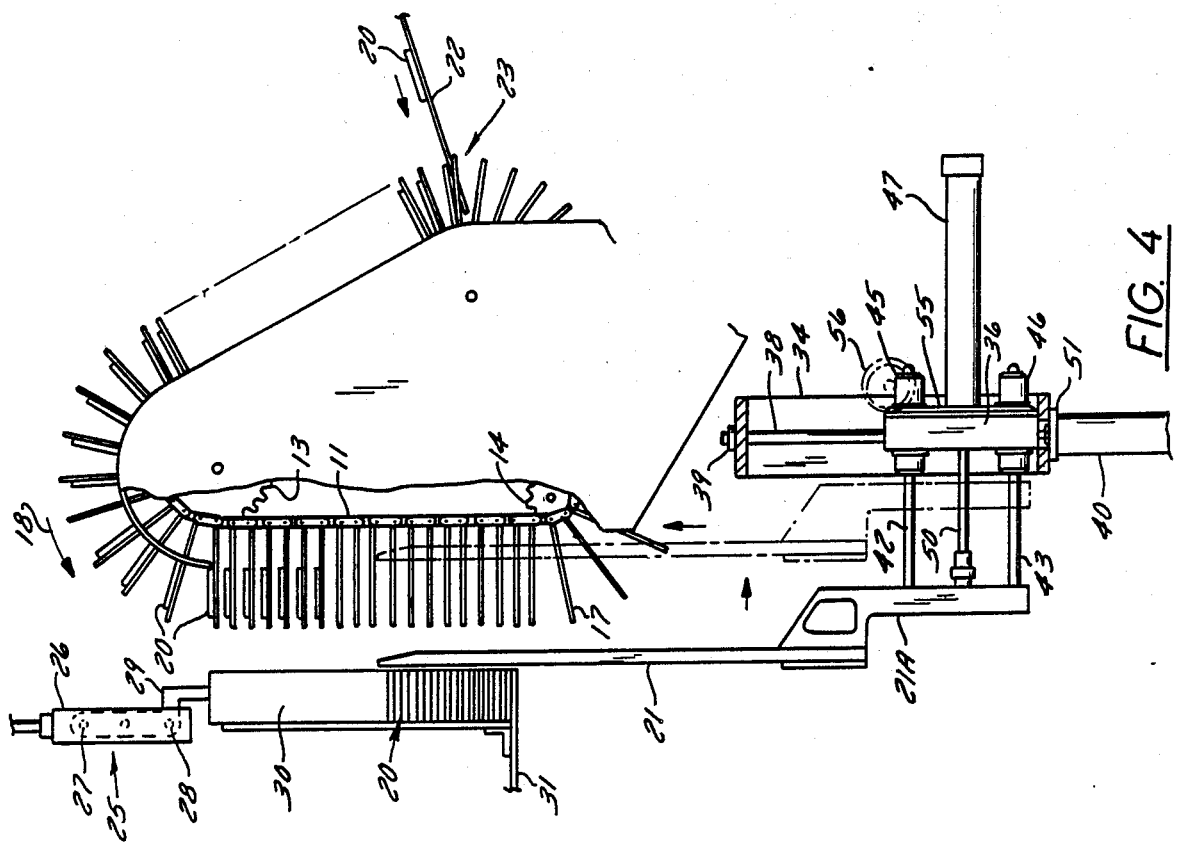
FIG. 4 shows the vertically disposed stripper bar in solid lines where it is positioned outwardly and most remotely from the paddles on the stacking machine and where it is shown in phantom lines when it has reached a position inwardly of the articles on the stacker paddles and is in the process of being projected upwardly to its upper limit.

FIG. 1 shows the principal components of a stacking machine which is generally designated by the numeral 10. The machine includes two closed loop conveyor chains a typical one 11 of which is visible in FIG. 1. There is another chain 12 running in parallelism with chain 11 as can be seen in FIG. 2. Chain 11 runs on three sprockets 13, 14 and 15. One of the sprockets is driven rotationally from the main shaft, not shown, of any article fabrication system in which the stacking machine depicted in FIG. 1 is installed. There is another set of sprockets similar to 13–15 on which chain 12 runs. As shown in FIG. 1, a series of paddles such as exemplary paddles 16 and 17 have their inner ends connected to the conveyor chains. There are corresponding paddles on each chain and there are spaces between corresponding paddles. The paddles are moving with the chains in the direction of the arrow 18. It will be evident that the paddles are hingedly connected to the conveyor chains in such manner that they are held substantially horizontal as they descend through the distance between the paddles which are marked 16 and 17 in FIG. 1. The leading paddle 17 on conveyor chain 11 has a counterpart 17A on conveyor chain 12. Thus, the articles 20 span across corresponding paddles. In FIG. 1, stripper bar 21 is in home position between the columns of paddles and the bar is in its uppermost position in readiness to shift to the left since the fifteen articles 20 comprising a stack in this example are presently arranged one above the other in readiness for being pushed or stripped from the paddles by leftward movement of stripper bar 21.

The articles 20 are introduced to the paddle conveyor by way of a conveyor belt 22 at a place 23 where the paddles fan out as a result of the conveyor chains passing around small radius sprockets such as the one marked 15. After being loaded on the paddles, the articles are conveyed upwardly at an angle with respect to vertical after which the paddles and the articles thereon are passed around sprocket 13 wherein they invert. In due course, the paddles such as the one marked 16 and those leading it at least down to the paddle marked 17 are all in a horizontal position with a column of articles 21 supported on them.

FIG. 1 also shows a pusher or shuttle mechanism which is generally designated by the numeral 25. The shuttle has a head 26 which is movable toward an observer in FIG. 1 on horizontal guide rods 27 and 28 when the observer is looking toward shuttle head 26 along a line of sight which is perpendicular to the plane of the drawing sheet and the shuttle head thereon. By way of an arm 29, the reciprocable head 26 is connected to a pusher plate 30. The means for advancing plate 30 toward the observer, when the observer is looking toward pusher plate 30 along a line of sight which is perpendicular to the plane of the drawing sheet and the pusher plate thereon, in FIG. 1 and retracting it to push a stack of articles away on a table 31 to make room for the next stack of articles is not shown because it is not new and is well known among designers of stacking machines.

Figure 8:
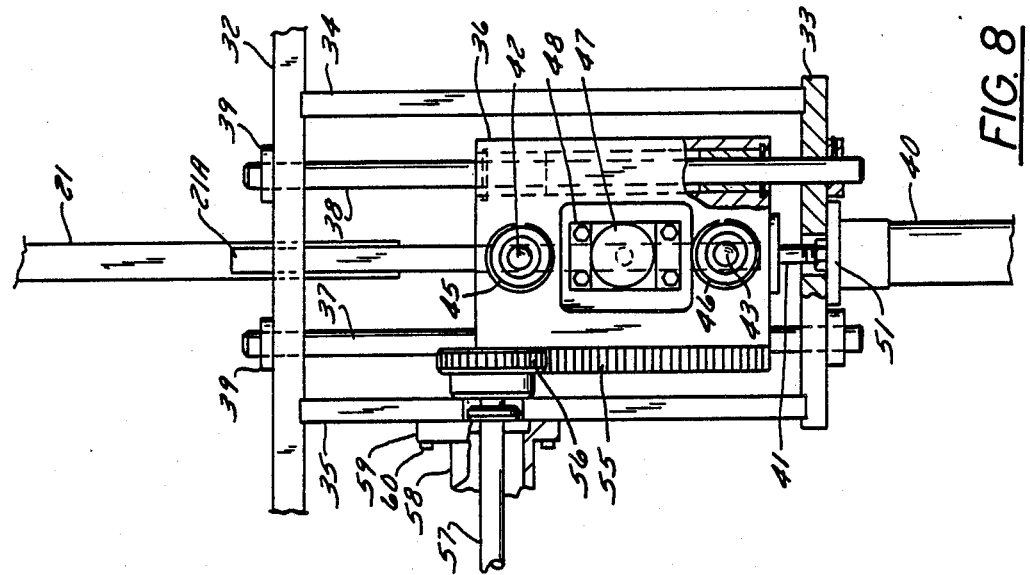
FIG. 8 is a rear elevational view of the stripper bar operating mechanism.
Figure 7:
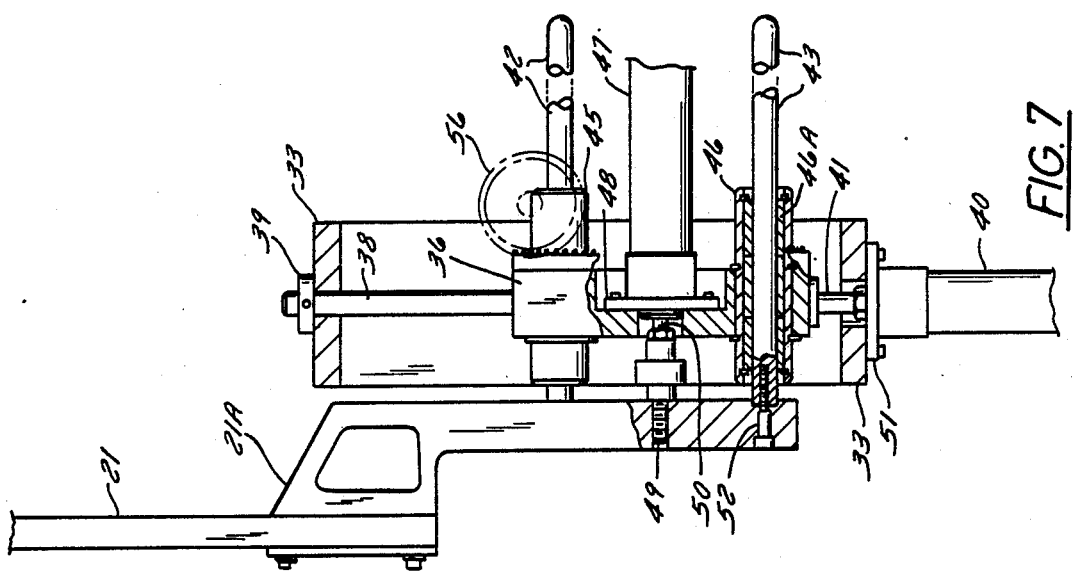
FIG. 7 is a side elevational view of the improved stripper bar operating mechanism.

The improved mechanism for manipulating the stripper bar 21 can be understood most easily by referring to FIG. 5. In FIG. 5 only the lower end 21A of stripper bar 21 is shown. The stripper bar manipulating mechanism in FIG. 5 is mounted in a frame comprised of top and bottom horizontally extending members 32 and 33 and vertical members 34 and 35. This frame is stationary and is part of the frame which supports the chain conveyor. Vertical movement of stripper bar 21 is achieved with a vertically movable carriage 36 which can move up and down on vertical guide rods 37 and 38 whose upper and lower ends are fastened in upper and lower frame plates 32 and 33, respectively. A collar such as the one marked 39 is pinned to rod 38 to keep the rods locked in the frame members. Carriage 36 is depicted in FIG. 5 in its lowermost position. A fluid pressure responsive actuator in the form of a double acting pneumatic work cylinder 40 is used to raise carriage 36 as required at very high speed. As mentioned earlier, in one operating mode the cylinder 40 is also used to drive the carriage downward rapidly when having the stripper bar locked to the downward speed of the paddles is no longer necessary. Cylinder 40 has a flange 51 by which it is fastened to frame plate 33 with machine screws as can be seen clearly in FIGS. 7 and 8. The piston rod 41 extending from the work cylinder 40 can be seen in FIG. 5 where it connects to the bottom of vertical carriage 36. The stripper rod base 21A is supported on horizontally disposed guide rods 42 and 43. The guide rods are attached to the stripper bar base 21A by means of machine screws 52 as shown in FIG. 7. These guide rods are slidable in linear bearings inside of fixed cylinders 45 and 46 which are mounted to carriage 36. A suitable linear bearing is shown in section and is visible in FIG. 7. A horizontal pneumatic work cylinder 47 shown in FIG. 5 has a flange 48, visible in FIG. 7, by which the cylinder is bolted to the vertical carriage. The work cylinder 47 is double acting. Its piston rod 50 connects to the stripper bar base 21A by means of a coupling stud 49 as shown in FIG. 7. It can push stripper bar 21 to the right as viewed in FIG. 5 for pushing a stack of articles off the conveyor paddles and it can be retracted rapidly to get behind the continuously descending articles that are on the vertical run of the paddles as depicted in FIG. 1.

In FIG. 5 the stripper bar 21 is retracted horizontally and the vertical carriage 36 is in its lowermost position but the bar must be driven to its uppermost position as it is in FIG. 1 to be in readiness for a stripping cycle. At the proper moment, that is, when a predetermined number of articles arrive in a column as between articles 16 and 17 in FIG. 1, horizontal work cylinder 47 is activated for the purpose of driving stripper bar 21 to the left. This is conventional in itself. In fact, as previously mentioned, prior practice was to have the horizontal guide rods 42 and 43 declined or slanted downwardly slightly to the left in an attempt to keep the stripper bar descending at about the same vertical component of speed as the articles are descending on the paddles. As was explained earlier, no single angle could keep the stripper bar moving with a vertical component of motion corresponding in speed to the downward speed of the paddles for all possible selectable speeds at which the chain conveyor can run. The solution, in accordance with the invention, is to provide for positively driving the stripper bar vertically during its horizontal transit outwardly at the same speed at which the paddles are descending and to achieve this speed automatically for any speed at which the machine is being operated.

For this purpose, a gear rack 55 is mounted to vertical carriage 36 as shown in FIG. 5 and in FIGS. 1, 3, 4, 7, and 8 as well. As is evident in FIGS. 3, 4, 5, 7 and 8, the teeth of a gear 56 are meshed with the teeth of rack 55 and it should be noted that the gear always remains meshed with the rack for any vertical position of carriage 36. Gear 56 is mounted on the end of a shaft 57 which is journaled for rotation in a cylindrical housing 58. The housing is mounted on a bracket 59 which is, in turn, fastened to vertical frame member 35 in FIG. 5. The bracket 59 and the manner in which it is fastened to frame member 35 by means of machine bolts 60, is shown most clearly in FIG. 8. Shaft 57 which supports the gear 56 has a toothed pulley 61 fastened to it as in FIG. 5. Another toothed pulley 62 is fastened to a shaft 63 which is parallel to gear shaft 57. Pulley 61 is driven rotationally by a toothed belt 64 which runs on driving pulley 62 as well as driven pulley 61. There is an electrically operated clutch 65 interposed between the power output shaft 63 of the clutch and the power input shaft 66. Electrical leads for energizing and deenergizing the operating coils in clutch 66 are marked 67. The power input shaft 66 to the clutch has fixed on it another toothed pulley 68 on which a toothed belt 69 runs. Toothed belt 69 is driven from a pulley, not shown, which rotates at a speed which is directly proportional to the speed at which the article fabrication machine system, not shown, is running and, of course, the chain conveyor, therefore, is also running at a speed that is proportional to the speed at which the article fabrication machinery is running. Consequently, when the article fabricating machine runs faster, power input shaft 66 to the clutch runs proportionately faster and so does the chain conveyor. If the article fabricating machine system is slowed down, the rotational speed of clutch power input shaft 66 and the speed of conveyor 10 slow down proportionately.

As previously indicated, the stripper bar 21 in FIG. 1 is positioned in readiness for stripping the articles 20 which are on paddles lying between the upper paddle marked 16 and the lower paddle marked 17 in FIG. 1. At the moment the desired number of articles 20 for a stack have arrived adjacent stripper bar 21, horizontally acting pneumatic cylinder 47 is activated to provide a horizontal component of movement for stripper bar 21 and simultaneously clutch 65 is engaged so pinion 56 starts driving carriage 36 vertically downward to provide a vertical component of stripper bar movement.

Figure 3:
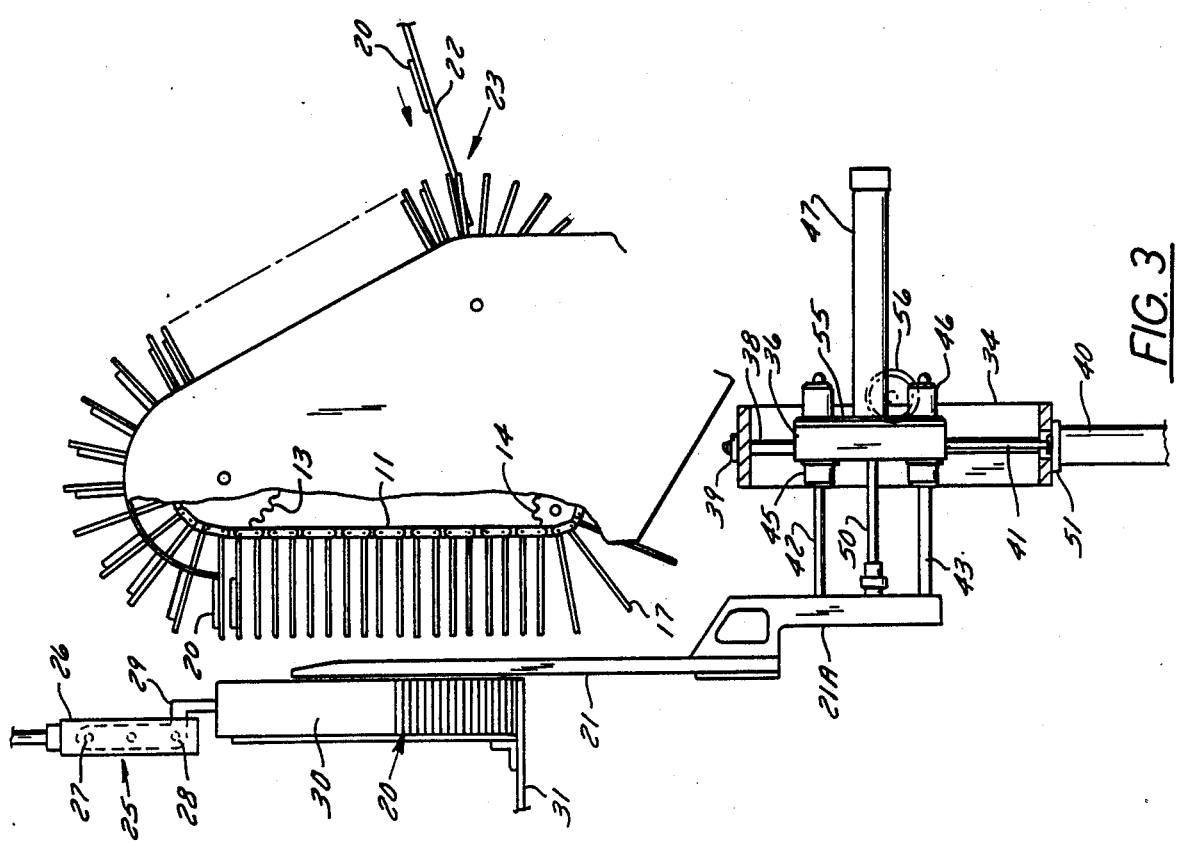
FIG. 3 shows the condition of the parts of the stacker and the vertically extending stripper bar immediately after stripping of a stack has been completed.

In FIG. 3 stripper bar 21 has been driven to its outermost position in respect to conveyor chains 11 and the paddles thereon. Clutch 65 is uncoupled at about the time the stack arrives at the table when the second and third operating modes are in effect but the clutch remains coupled when the first operating mode is in effect as will be elaborated later. The stack of articles deposited on table 31 is collectively designated by the numeral 20. Shuttle plate 30 can now be projected toward the observer to send the stack of articles on its way to a packaging machine, not shown. At that moment the clutch is inactivated and uncoupled because the need for speed matching of the stripper bar and paddles is temporarily not needed. The carriage 36 then descends according to the appropriate one of the three modes mentioned earlier. In FIG. 3, vertically movable carriage 36 is presently descending and, consequently, horizontal guide bars 42 and 43 and the stripper bar 21 mounted thereon are also moving downwardly. The gear 56 is, of course, engaged with toothed rack 55 but since the clutch 65 is not engaged in the time frame of FIG. 3 gear 56 is simply rotating freely as the carriage 36 continues downwardly.

In FIG. 4, the stripper bar 21 is shown in solid lines but it should be noted that it is presently lower than it was in FIG. 1 since the vertically moving carriage 36 has continued to descend to its lower limit. In FIG. 4, the stripper bar 21 is also depicted in phantom lines to indicate that it is retracted inwardly to the space between the articles on the conveyor and the chains. The phantom line version of the stripper bar 21 is in its depicted position as a result of horizontal work cylinder 47 retracting it inwardly as it moves downwardly. When the stripper bar 21 is on its way to the position in which it is depicted in phantom lines in FIG. 4, double acting pneumatic work cylinder 40 is activated so as to begin raising the stripper bar for it to be at its uppermost limit in readiness for stripping a stack of articles 20 from the paddles when a stack has accumulated as in FIG. 1.

A more detailed description of how the stripper bar is manipulated and timed or synchronized with machine speed will now be set forth in reference to the FIG. 6 diagram.

In FIG. 6 the stripper bar to which the reference numeral 21 is affixed is in its uppermost position and is ready for being shifted rapidly to the left to push a stack of articles 20 off of their superimposed column of paddles. The upper tip T of stripper bar 21 is at its uppermost position indicated by the numeral 1. At the instant the correct number of articles to form a stack is aligned with stripper bar 21, horizontal pneumatic cylinder 47 is activated and the stripper bar is moved transversely between corresponding paddles in each pair and across the downwardly moving stack of articles. At the same instant that the pneumatic cylinder 47 is activated, electric clutch 65 is activated and engaged and gear 56 begins to drive vertically movable carriage 36 downwardly at a speed that is matched to the speed at which the machine is running as previously explained. Consequently, the tip T of the stripper bar has a vertical speed component proportional in magnitude to the length of the vertically directed arrow 90 in the dashed line vector diagram. The downward component of speed of the stripper bar 21 is exactly equal to the downward speed of the articles carried on the vertical run of the conveyor chains. This is very important because it assures that an uppermost article in the stack proximate to the tip T will not be missed by a stripper bar moving downwardly too rapidly and that an extra article will not be stripped from the conveyor paddles if the stripper bar is moving downwardly too slowly. It also avoids any wiping or crushing force between the bar and the articles.

At the moment the stack of articles 20 are deposited on table 31 by the stripper bar, the tip of the stripper bar is in the position marked 2. At that moment, vertical dropping or gear driving of the carriage 36 and the stripper bar is initiated. This rapid downward movement brings the tip of the stripper bar to the position marked 3 which is well below the leading one 17 of the downwardly moving articles on the conveyor. At about the same time the stripper bar reaches the number 3 position, horizontally driving pneumatic cylinder 47 is activated again and the stripper bar is pushed transversely of the moving conveyor chains as indicated by the arrow 91. The upper tip of the stripper bar is then at the position marked 4. At this time, the horizontal driving pneumatic cylinder 47 is deactivated and vertical driving pneumatic cylinder 40 is activated to push the stripper bar upwardly to restore it in juxtaposition to the accumulating stack of articles as was the case at the beginning of an operating cycle of the bar which has just been outlined. The actual timing of the clutch and vertical and horizontal pneumatic cylinders is such that the stripper bar tip T moves from position 3 through position 4 to position 1 simultaneously. In other words, the line of motion of the stripper bar tip T from position 3 through position 4 and to position 1 would demark a curved line such that the lower end of the stripper bar would never actually get to the position which is marked 5.

The differences between the previously mentioned three alternative operating modes will now be elaborated. The first operating mode is used when the articles 20 are narrow in width. Refer first to FIG. 1 where a stack of the selected number of articles 20 has accumulated and the stripper bar 21 is about to be moved to the left to strip the stack from the paddles. Because it is assumed that the articles 20 are narrow the stripper bar 21 does not need to be as far to the right when in home position as would be the case if the articles were wider. This means that the stripper bar does not need to move as far to the left to deposit a stack of articles on table 31 as would be the case if the bar had started from a home position farther to the right in FIG. 1 so this movement takes less time for narrow articles. Other movements of the stripper bar can be allowed to take more time and yet the stripper bar will be restored to home position early enough.

In the first mode as in all operating modes when a stack has accumulated next to the stripper bar, horizontal pneumatic cylinder 47 is activated to push the stripper bar to the left as viewed in FIG. 1 and simultaneously clutch 65 is engaged so gear 56 drives the rack 55 and carriage 36 vertically downwardly at the speed equal to the downward speed of the conveyor panels 17. In this first mode of operation, after the stack of articles 20 is deposited on table 31, clutch 65 is allowed to remain engaged so the gear 56 will drive the carriage and stripper bar down to its lower limit at a speed corresponding to the vertical downward speed of the paddles before the clutch needs to be disengaged to allow the horizontal pneumatic cylinder 47 to start drawing the stripper bar inwardly again. During descent of the stripper bar the pneumatic cylinder 40 for moving the carriage 36 vertically upwardly is exhausted so that it offers no resistance to downward drive of the stripper bar by the gear 56. The first mode is the slowest of the modes but it works well for small stacks especially.

The second operating mode is used when the articles are medium wide so that the horizontal travel of the stripper bar 21 from home position to the position where the stack is deposited on table 31 is greater and the time is greater than when in the first mode. In the second mode, as in all modes, the carriage 36 and the stripper bar 21 are driven with a downward component by the gear 56 during the time the stripper bar is in transit between home position in FIG. 1 to the position wherein the stack is deposited on table 31 as in FIG. 3 so the bar moves vertically at the speed of conveyor paddle 17. In the second mode, at the moment the stack of articles is deposited on table 31 correlation between the vertical speed of the stripper bar and paddle speed becomes unnecessary so clutch 65 is disengaged and gear 56 can become free wheeling to let the carriage 36 and stripper bar 21 drop freely under the force of gravity. This is much faster than if the gear 56 were driven through the clutch and the carriage 36 and stripper bar 21 were driven downwardly at the vertical speed of the conveyor paddles. Of course, during the free fall, vertical pneumatic cylinder 40 is unpressurized and vented to the atmosphere so it offers no resistance to the downward drop of the carriage. When, or even before, the carriage drops to its lowest limit, horizontal pneumatic cylinder 47 is activated to pull the stripper bar horizontally after which the vertical cylinder 40 is activated to raise the stripper bar to home position again.

The third operating mode is optional and is used where the conveyor speed and, hence, the downward speed of the paddles is highest. In this mode the clutch 65 is disengaged and the gear drive of the carriage 36 and stripper bar is terminated at the moment the stripper bar deposits a stack on table 31. At this moment, pneumatic cylinder 40 is activated for driving the carriage 36 down at maximum speed and this is followed by horizontal inward shifting of the carriage and upward movement to restore the stripper bar to home position as it is in FIG. 1.

A control system for activating and deactivating the clutch 65 and the horizontal and vertical pneumatic cylinders 41 and 40 is implemented with conventional and commercially available components so the control system need not be described in detail. It will be understood, of course, that there are electric wires leading to the clutch for connecting to the leads 67. And, of course, there are the usual air connectors, not shown, on the double acting pneumatic work cylinders for pressurizing opposite sides of the piston therein and for exhausting air. The controller is symbolized by the block marked 80 in FIG. 9. A commercially available programmable limit switch system or programmable logic controller can be used. This controller will have an input 81 for a signal from an encoder, not shown, or a pulse generator, which provides information as to the angular position of the machine main drive shaft, not shown, so that all control activities can be synchronized with the machine main drive shaft. Some output lines from the controller in FIG. 9 are marked 82 and these may be connected to the magnetic clutch leads 67. Another group of output lines 83 symbolize control wires which, in an actual embodiment, transmit electric signals for activating and deactivating relays, not shown, which open and close valves in the air and exhaust lines, not shown, which are connected to the pneumatic cylinders 47 and 40.

Although a preferred embodiment of the invention has been described in detail, such description is intended to be illustrative rather than limiting, for the invention may be variously embodied and is to be limited only by interpretation of the claims which follow.

We claim:

1. A stripper device for stripping articles from the conveyor of an article stacking machine, the conveyor comprising: closed loop flexible means driven lengthwise continuously, a series of paddle members disposed along the length of said flexible means, said paddle members having corresponding inside ends connected to said flexible means and extending outwardly therefrom for articles to be deposited on said paddle members at one location and for a series of articles to be accumulated on said paddle members, respectively, where a series of generally vertically moving paddle members are above and below each other at another location to facilitate stripping said articles from said paddle members to form a stack of articles, said stripper device comprising:

a vertically extending stripper bar for stripping simultaneously said articles from a predetermined number of continuously downwardly moving paddle members by way of said bar moving transversely to the path of said moving paddle members from the uppermost position of said bar inwardly of said paddle members to a position outwardly of said paddle members, a carriage and a first fluid pressure responsive actuator connected to said carriage and operative in one mode to raise said carriage to an uppermost position, means for mounting said stripper bar on said carriage for being moved substantially horizontally and a second fluid pressure responsive actuator operatively connected to said stripper bar for moving said bar cyclically outwardly away from said paddle members and inwardly of said paddle members, a vertically extending gear rack mounted to said carriage, a gear meshed with said gear rack and a rotatable shaft supporting said gear for rotation, a clutch having power input and output means and means for driving said input means at a speed which is proportional to the speed at which said paddle members are moving downwardly, means coupling said power output means of the clutch to said gear such that when said clutch is activated said gear is rotated to drive said carriage and the stripper bar mounted thereto downwardly at the same speed at which said paddle members are moving downwardly, and control means for controlling operating of said clutch and said fluid responsive actuators.

2. The apparatus according to claim 1 wherein:
said control means activates and deactivates said clutch and said first and second fluid pressure responsive actuators, said control means activating said clutch and said second actuator simultaneously at the instant said predetermined number of said continuously downwardly moving articles accumulate next to said stripper bar so that said gear drives said carriage and stripper bar at a vertical speed equal to the vertical speed of said articles at least until said bar has moved transversely outwardly past the paddles to deposit the stack of articles.

3. The stripper device according to claim 1 wherein said control means is operative to deactivate said clutch after said stack of articles are deposited such that said carriage drops freely under the influence of gravity toward a lower position and said gear rotates freely as it moves along said rack.

4. The stripper device according to claim 1 wherein said control means is operative to maintain activation of said clutch after said articles are deposited such that said carriage is driven downwardly under power transmitted by said clutch and said clutch is deactivated when said carriage reaches a predetermined lower position.

5. The stripper device according to claim 1 wherein said control means is operative to activate said first fluid pressure responsive actuator after said articles are deposited for said actuator to drive said carriage downwardly at high speed.

6. The apparatus according to any one of claims 3, 4 or 5 wherein when said stripper bar is being driven downwardly after said articles have been deposited, said second actuator is activated to start driving said stripper bar transversely inwardly toward said paddle members to an inward limit at which time said first actuator is activated to rapidly raise said stripper bar back to said upper position.

7. The apparatus according to any one of claims 1, 2, 4 or 5 including:
- a toothed pulley fixed concentrically on said shaft supporting the gear,
- said power output means of the clutch including a shaft and a toothed pulley on said shaft,
- a toothed belt running on said pulleys,
- said power input means of said clutch including a shaft and a toothed pulley on said shaft, a belt running on said last named pulley, said belt driving said pulley at a speed proportional to the speed of said conveyor.

* * * * *